(12) United States Patent
Fung

(10) Patent No.: US 10,080,958 B2
(45) Date of Patent: Sep. 25, 2018

(54) MULTIPLE ELECTRONIC CONTROL DEVICES

(71) Applicant: Blue Goji LLC, Austin, TX (US)

(72) Inventor: Coleman Fung, Spicewood, TX (US)

(73) Assignee: BLUE GOJI LLC, Austin, TX (US)

( * ) Notice: Subject to any disclaimer, the term of this patent is extended or adjusted under 35 U.S.C. 154(b) by 221 days.

(21) Appl. No.: 14/846,966

(22) Filed: Sep. 7, 2015

(65) Prior Publication Data

US 2017/0065880 A1    Mar. 9, 2017

(51) Int. Cl.
*G06F 3/00* (2006.01)
*A63F 13/24* (2014.01)
*G06F 3/01* (2006.01)
*A63F 13/00* (2014.01)

(52) U.S. Cl.
CPC .............. *A63F 13/24* (2014.09); *A63F 13/00* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 7,699,755 B2* | 4/2010 | Feldman | A63B 21/002 482/1 |
| 8,740,705 B2* | 6/2014 | Yamazaki | A63F 13/06 463/36 |
| 2006/0003838 A1 | 1/2006 | Kobayashi et al. | |
| 2011/0275432 A1 | 11/2011 | Lutnick et al. | |
| 2014/0248996 A1* | 9/2014 | Adel | A63B 24/0062 482/8 |
| 2014/0365593 A1 | 12/2014 | Sun | |
| 2015/0074047 A1 | 3/2015 | Gardes et al. | |

* cited by examiner

*Primary Examiner* — Idriss N Alrobaye
*Assistant Examiner* — Richard B Franklin
(74) *Attorney, Agent, or Firm* — Galvin Patent Law LLC; Brian R. Galvin

(57) ABSTRACT

A system for using multiple electronic control devices to interact with electronic devices, comprising an electronic control device that communicates with a plurality of electronic devices via a network, that receives user interaction and conveys it to devices via the network, and that receives interaction from other devices via the network and conveys it to a host device, and a method for nested communication between multiple electronic control devices and electronic systems.

6 Claims, 9 Drawing Sheets

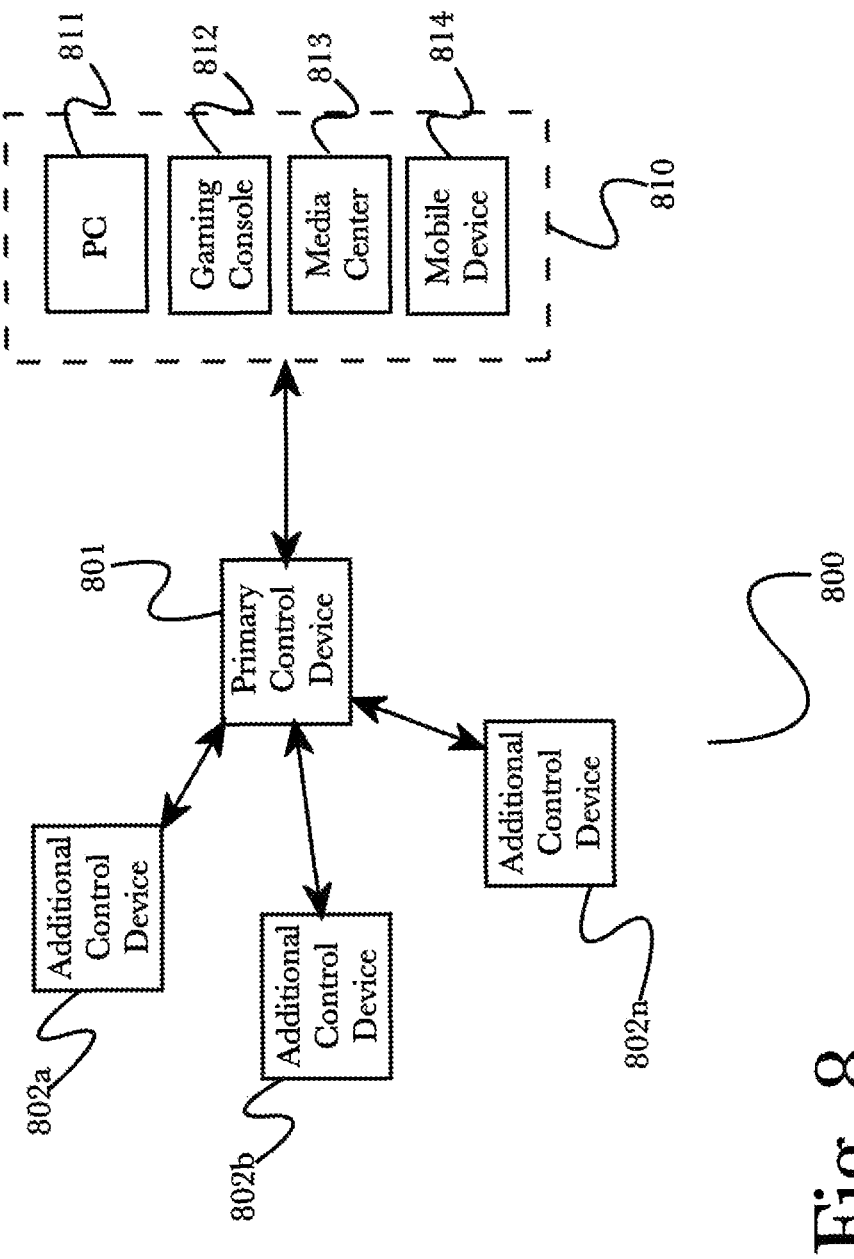

MULTIPLE ELECTRONIC CONTROL DEVICES

CROSS-REFERENCE TO RELATED APPLICATIONS

None.

BACKGROUND OF THE INVENTION

Field of the Art

The disclosure relates to the field of electronic devices, and more particularly to the field of wireless handheld controllers for interacting with host devices.

Discussion of the State of the Art

In the field of electronic devices, separate handheld controllers are commonly used to enable a user to provide interaction or receive feedback from a host device, such as a personal computer or a video gaming console. These controllers may be connected via a wired or a wireless connection, and generally are paired with only a single host device at any given time. When a user wishes to utilize multiple controllers, they must be connected individually to the host device (for example, connecting both a keyboard and a mouse to a personal computer, using two separate ports on the computer). This requires a number of separate communication connections between a host device and controllers, and if a host device or controller have mismatched communication hardware, they are incompatible and cannot be used. Additionally, controllers generally are designed for a particular purpose (such as for a particular type of video game or computer application), and require a user to interact with them in a specific fashion, such as to hold the controller in a particular manner to have manual access to all of its functions. This can be awkward or even unhealthy for the user, and restrictive of the manner with which they interact with the device.

What is needed, is a means to enable users to connect a variety of controllers to a host device regardless of their communication means, that also addresses the need for controllers that a user may interact with in a customizable fashion to enhance ergonomics as well as improve the quality of interaction.

SUMMARY OF THE INVENTION

Accordingly, the inventor has conceived and reduced to practice, in a preferred embodiment of the invention, multiple electronic control devices that may be paired with a plurality of host devices and may communicate used nested communication.

According to a preferred embodiment of the invention, a system for using nested-communication wireless control devices to interact with electronic devices, comprising an electronic control device comprising at least a plurality of programming instructions stored in a memory and operating on a processor of a network-connected computing device and configured to communicate with a plurality of electronic devices via a network, and configured to operate a plurality of hardware control elements, the hardware control elements configured to receive a plurality of manual interaction from a human user, and configured to transmit a plurality of interaction information to at least a portion of the plurality of electronic devices, the interaction information being based at least in part on at least a portion of the plurality of manual interaction from a human user, and configured to receive communication from at least a portion of the plurality of electronic devices and convey at least a portion of the communication to at least a portion of the plurality of electronic devices, is disclosed.

According to another preferred embodiment of the invention, a method for nested communication between control devices and electronic systems, comprising the steps of connecting, via a first electronic control device comprising at least a plurality of programming instructions stored in a memory and operating on a processor of a network-connected computing device and configured to communicate with a plurality of electronic devices via a network, and configured to operate a plurality of hardware control elements, the hardware control elements configured to receive a plurality of manual interaction from a human user, and configured to transmit a plurality of interaction information to at least a portion of the plurality of electronic devices, the interaction information being based at least in part on at least a portion of the plurality of manual interaction from a human user, and configured to receive communication from at least a portion of the plurality of electronic devices and convey at least a portion of the communication to at least a portion of the plurality of communication devices, to a host electronic device via a network; connecting, using an additional electronic control device comprising at least a plurality of programming instructions stored in a memory and operating on a processor of a network-connected computing device and configured to communicate with a plurality of electronic devices via a network, and configured to operate a plurality of hardware control elements, the hardware control elements configured to receive a plurality of manual interaction from a human user, and configured to transmit a plurality of interaction information to at least a portion of the plurality of electronic devices, the interaction information being based at least in part on at least a portion of the plurality of manual interaction from a human user, and configured to receive communication from at least a portion of the plurality of electronic devices and convey at least a portion of the communication to at least a portion of the plurality of communication devices, to the first electronic control device; receiving a plurality of user interaction at an additional electronic control device; transmitting a plurality of interaction information to the first electronic control device, the interaction information being based at least in part on at least a portion of the user interaction; and conveying, at the first electronic control device, at least a portion of the interaction information to the host electronic device, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 8 is a block diagram of an exemplary system architecture, illustrating the use of nested-communication control devices with a variety of electronic systems, according to a preferred embodiment of the invention.

DETAILED DESCRIPTION

Figure 1:
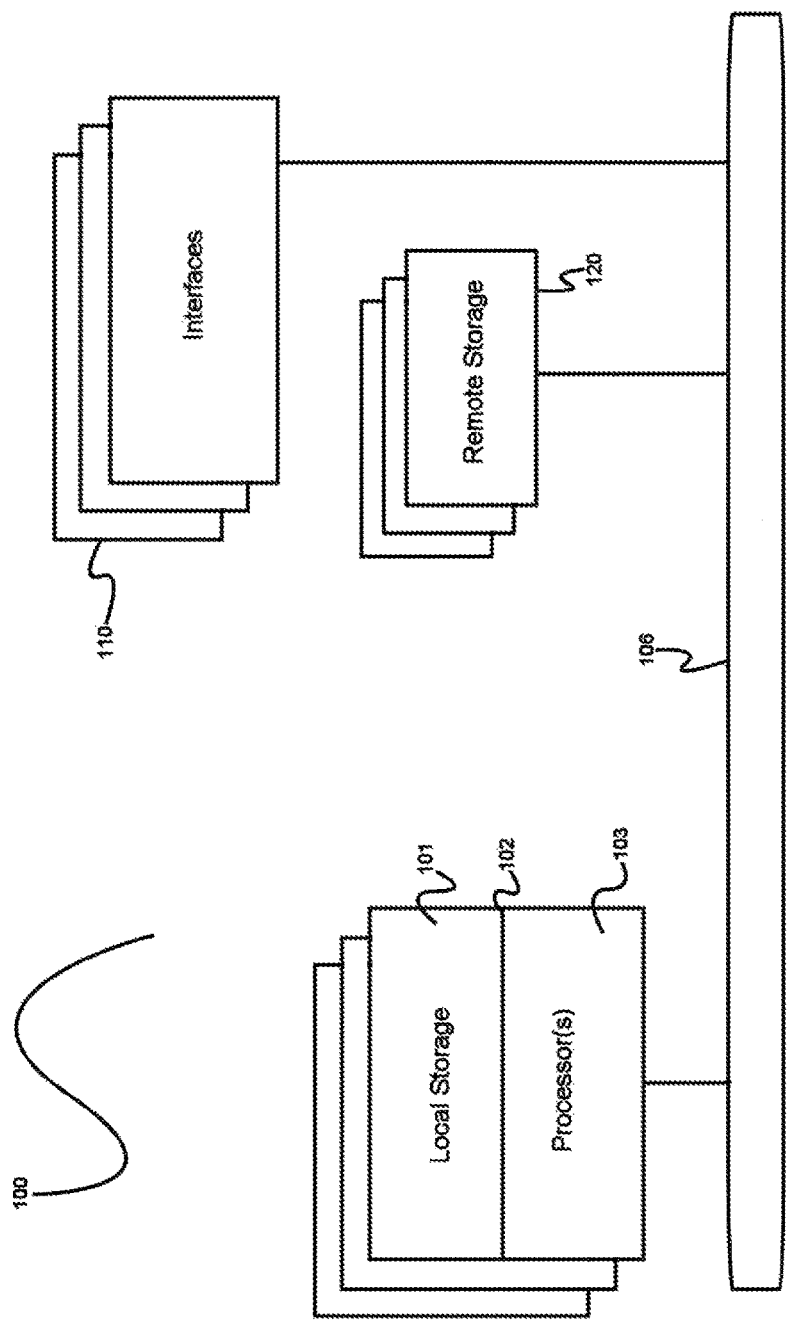
FIG. 1 is a block diagram illustrating an exemplary hardware architecture of a computing device used in an embodiment of the invention.

The inventor has conceived, and reduced to practice, in a preferred embodiment of the invention, multiple electronic control devices that may be paired with a plurality of host devices and may communicate used nested communication.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
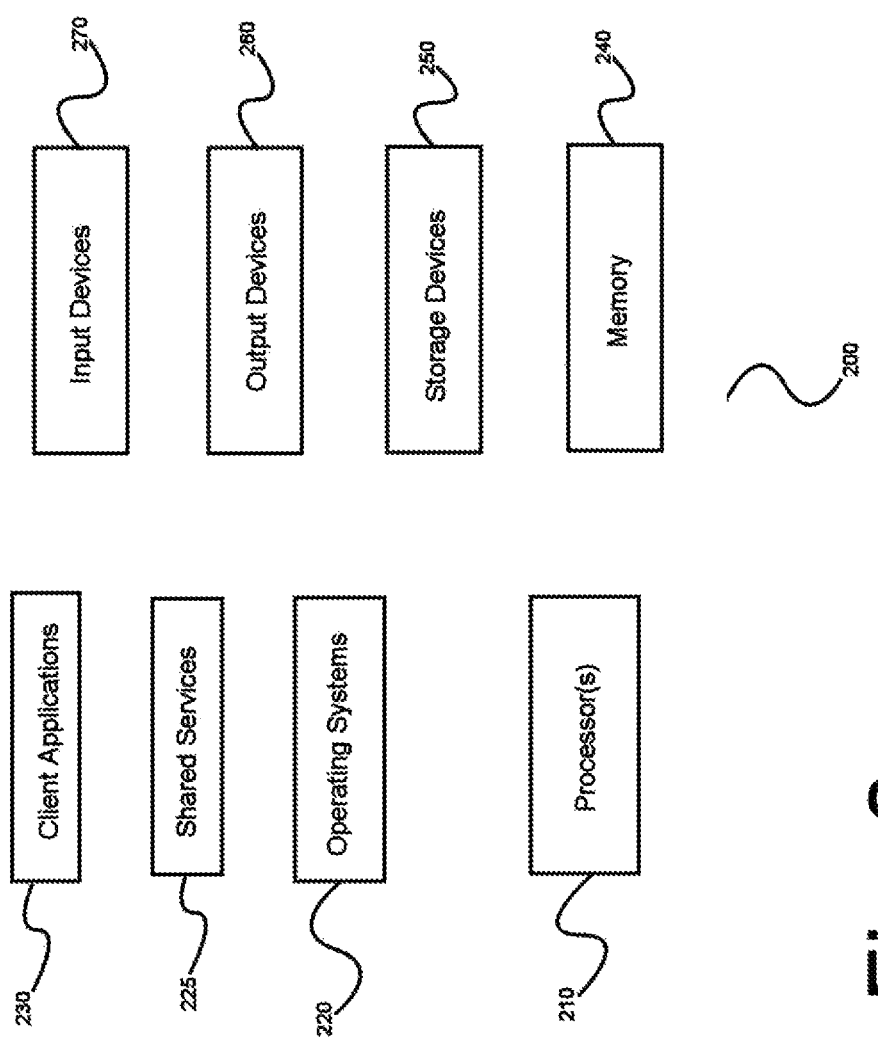
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
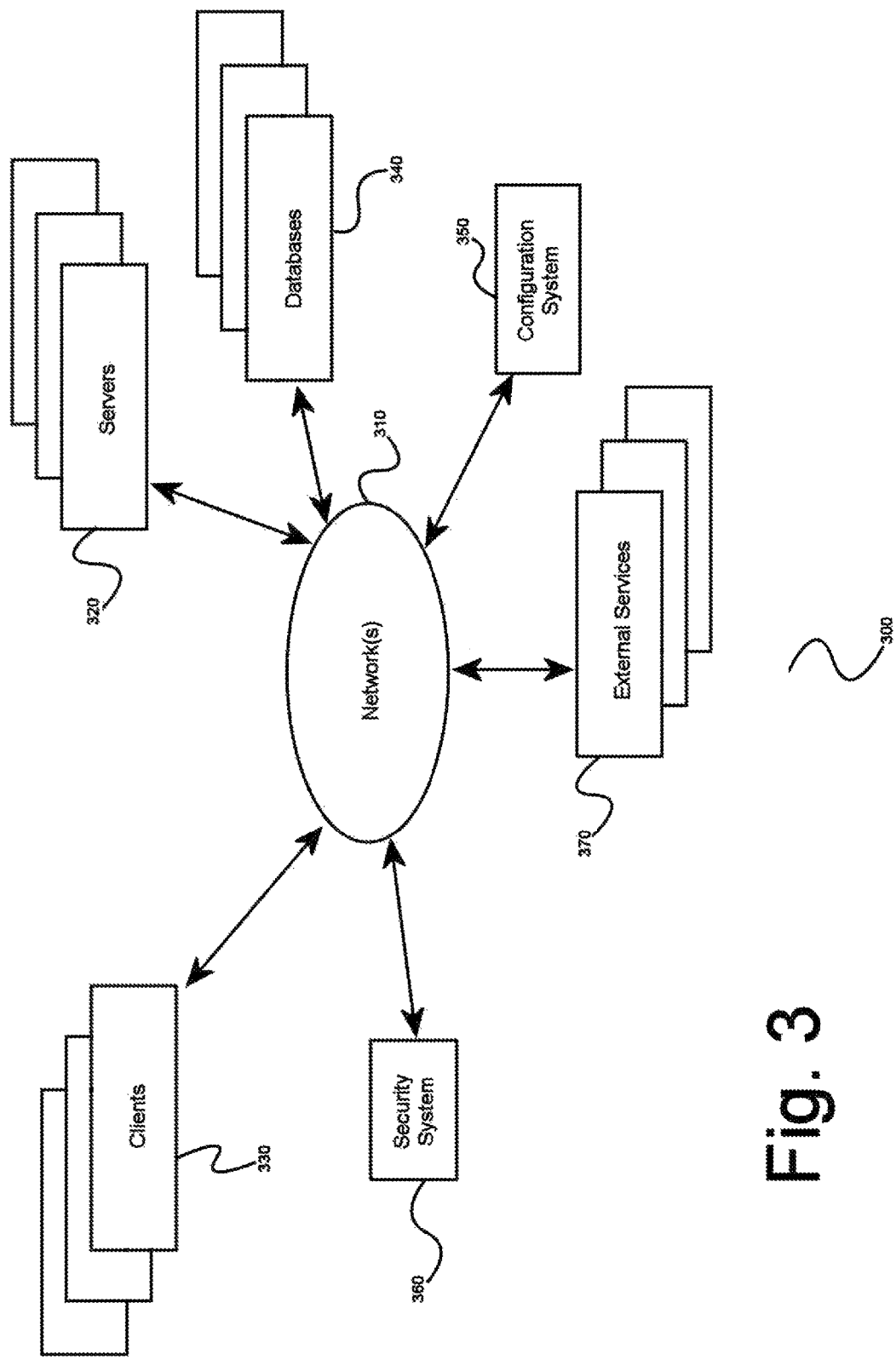
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
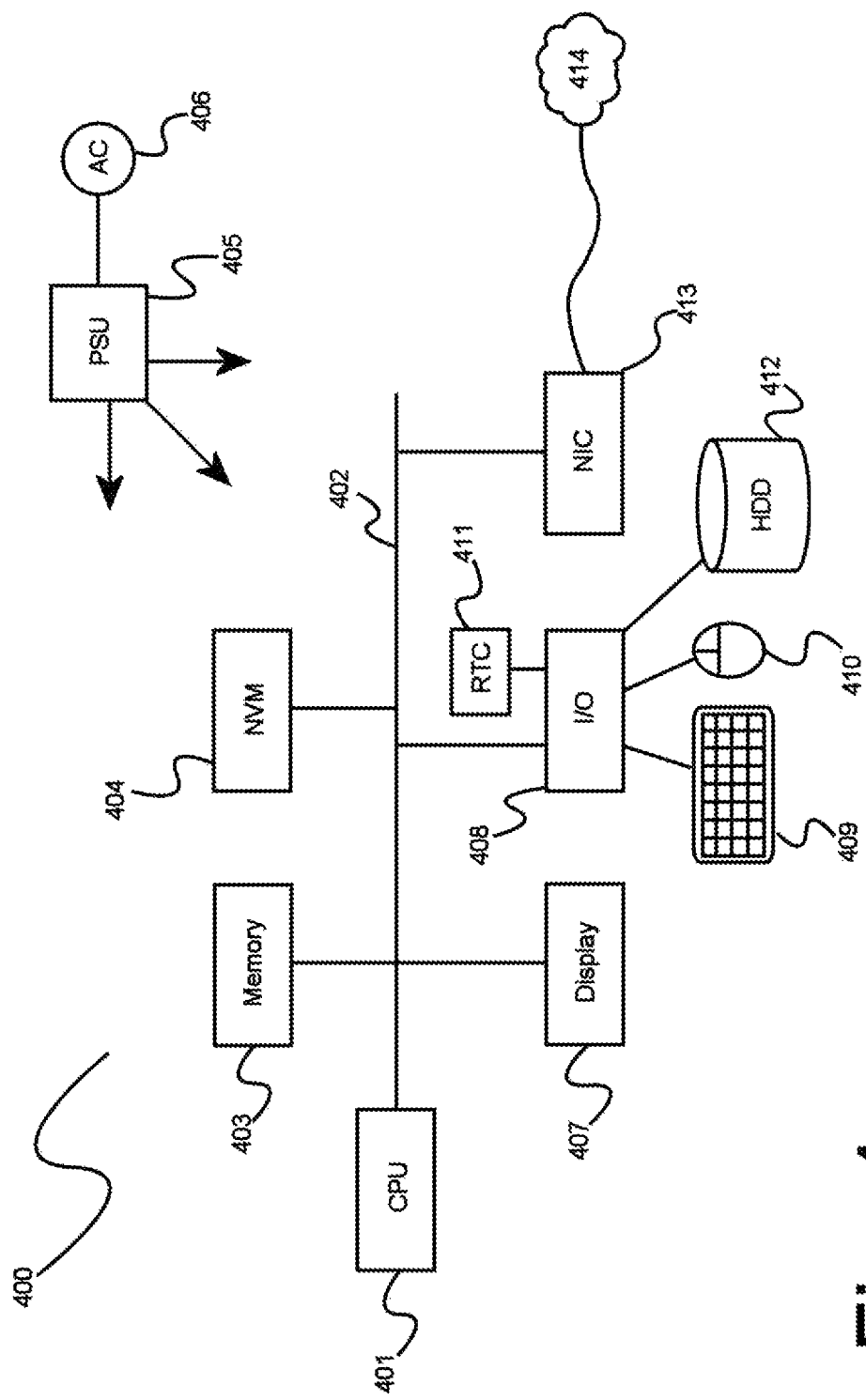
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 8 is a block diagram of an exemplary system architecture 800, illustrating the use of nested-communication control devices 801, 802a-n with a variety of electronic systems 810, according to a preferred embodiment of the invention. According to the embodiment, a control device 801 may be connected to a plurality of electronic systems 810 such as including (but not limited to) a personal computer 811, video gaming console 812, media center (for example, a home theater system) 813, or mobile device 814 (for example, a smartphone or tablet computing device). Connection may occur via a variety of means, but according to the embodiment and as envisioned by the inventors, an ideal method of connection is via wireless connectivity means over the air. Exemplary communication protocols or technologies for such connectivity may include (but are not limited to) cellular radio communication, BLUETOOTH™, ANT™, WiFi, near-field communication (NFC), or other connectivity means.

According to the embodiment, a plurality of additional control devices 802a-n may be paired with a primary control device 801 via a variety of connectivity means. When connected in this manner, input from a user interacting via an additional control device 802a-n may be transmitted to primary control device 801, which may then convey the interaction to a plurality of connected electronic systems 810. Feedback, if provided by an electronic system 810, may then be received by primary control device 801 and conveyed to additional control devices 802a-n as needed (for example, if a user interacts via a particular additional control device 802a, and an electronic system 810 provides feedback intended specifically for that user or that device). It should be appreciated that not all control devices need to utilize similar connectivity means. For example, if a primary control device 801 is operating both a BLUETOOTH™ and a WiFi radio for wireless communication, an additional control device 802a may connect via BLUETOOTH™ while a second additional control device 802b may connect using WiFi. In this manner, a primary control device 801 may be considered a means to unify various connectivity means to facilitate communication between a plurality of electronic systems 810 and a plurality of additional control devices 802a-n of varying design and operation.

DETAILED DESCRIPTION OF EXEMPLARY EMBODIMENTS

Figure 5:
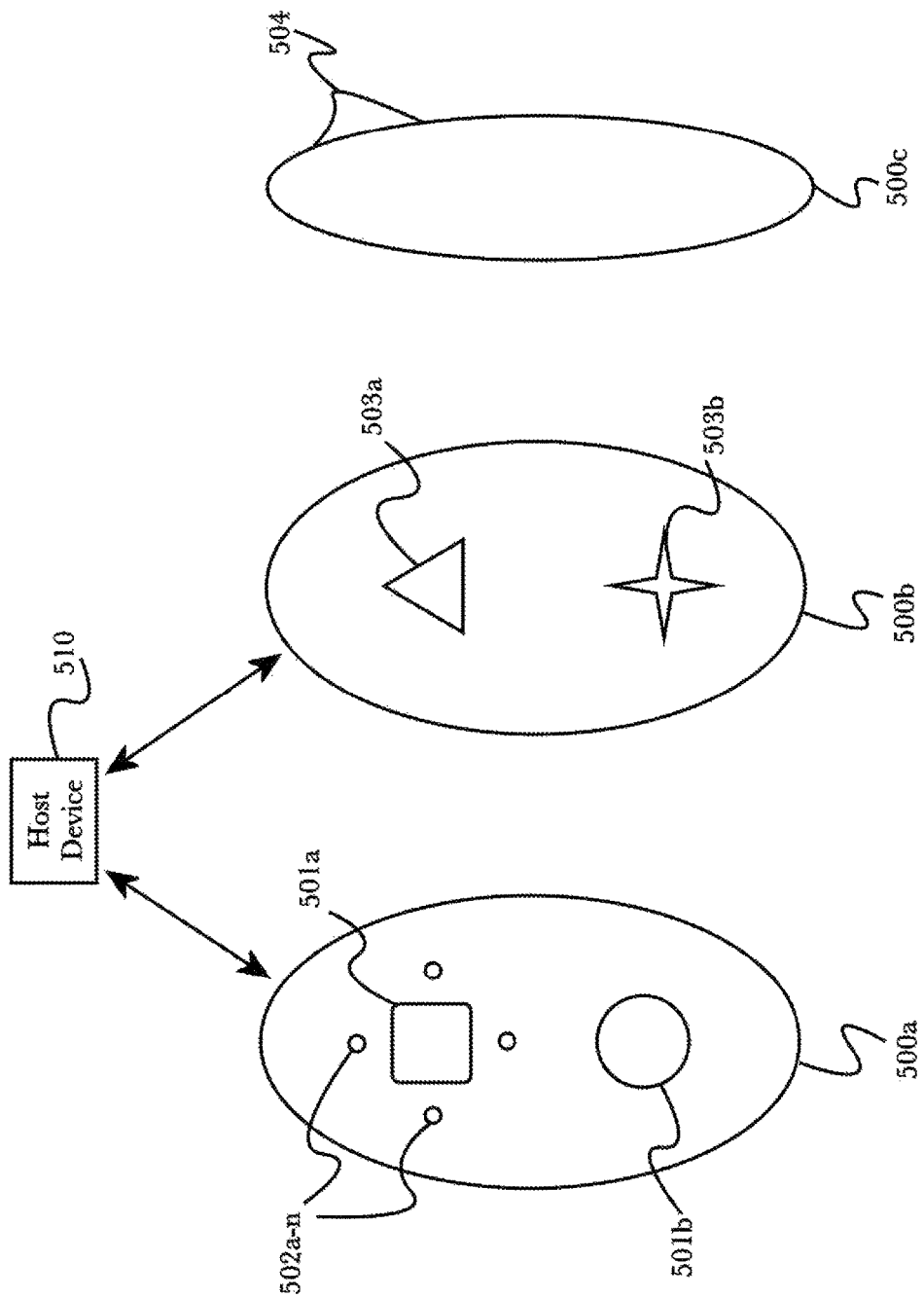
FIG. 5 is a diagram illustrating an exemplary physical arrangement of paired, nested-communication wireless control devices, according to a preferred embodiment of the invention.

FIG. 5 is a diagram illustrating an exemplary physical arrangement of paired, nested-communication wireless control devices 500a-b, according to a preferred embodiment of the invention. According to the embodiment, a plurality of wireless control devices 500a-b may be "paired" to a plurality of electronic host devices 510 (for example, including but not limited to a gaming console device, personal computer, mobile device such as a smartphone or tablet computing device, media device, or other electronic devices that may receive user interaction via a physically-separate controller or controllers) via a wireless communication protocol such as including (but not limited to) BLUETOOTH™, WiFi, NFC, ZIGBEE™, cellular radio frequencies (for example, either via an existing GSM or other cellular network, or by using cellular frequencies to create an ad-hoc or "mesh" network between devices as needed), or other suitable wireless communication protocols or technologies. According to the embodiment, two physically-separate controllers 500a-b may be paired to a host 510, for a user to hold one controller in each hand for ease of manipulation and ergonomic comfort. For example, a user may hold the controllers at a comfortable angle and distance while seated, enabling a greater level of comfort than would be possible with a single controller manipulated with both hands. For example, a user may grasp a controller in each hand during exercise or full-body interactive gameplay, such as while running on a treadmill or interacting with a virtual fitness trainer such as using a NINTENDO WII™ gaming console. It should also be appreciated that a control device 500a-b may optionally be paired with more than one host device 510, for example using a single controller to interact with multiple computers or mobile devices, for example for giving a presentation or directed instruction, where an instructor may interact directly with students' devices.

Figure 5A:
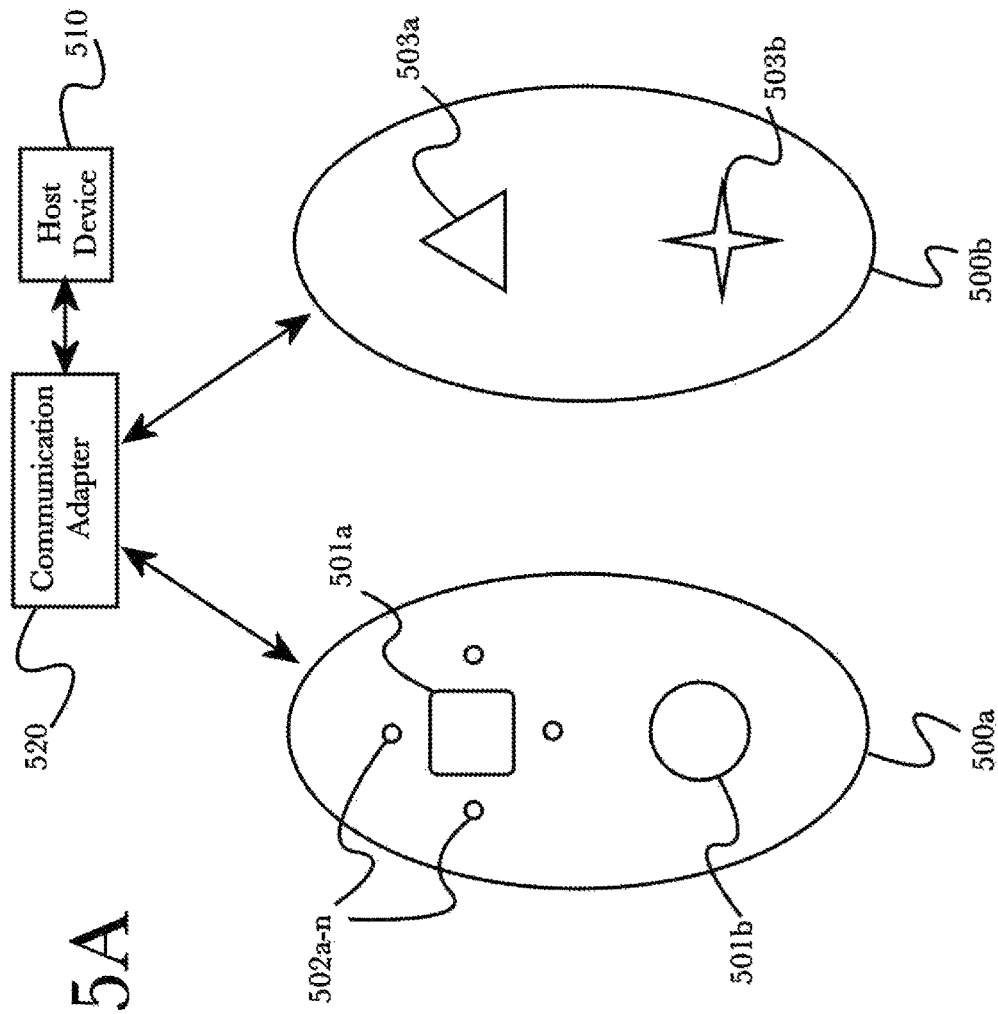
FIG. 5A is a diagram illustrating an exemplary physical arrangement of paired, nested-communication wireless control devices, illustrating communication via an adapter according to a preferred embodiment of the invention.

FIG. 5A is a diagram illustrating an exemplary physical arrangement of paired, nested-communication wireless control devices 500a-b, illustrating communication via an adapter 520 according to a preferred embodiment of the invention. According to the embodiment, a communication adapter 520 may be utilized to facilitate communication between a plurality of controllers 500a-b and a plurality of host devices 510, for example to connect multiple physical controllers and present them to a host as a single "virtual controller" (as may be required according to a particular software application being interacted with, for example a video game that requires a unitary controller design) or to bridge communication between host and controllers that may otherwise be incapable of communicating (for example, if one device relies solely on a BLUETOOTH™ radio for connectivity while other use WiFi, or if two different communication protocols are in use). Additionally, a communication adapter may be operated by a control device, for example in an arrangement where multiple additional or "secondary' controllers communicate with a designated "primary" controller, which in turn communicates with a host device, for example by receiving communication from each additional controller and presenting all communication to a host device in a "nested-communication" arrangement wherein the primary controller serves as a communication adapter between other controllers and a host (as described below, referring to FIGS. 6-7). For example, a primary controller may be operate a communication adapter 520 to bridge communication between fitness trackers or wearable devices (for example, such as FITBIT™, APPLE WATCH™, or MICROSOFT BAND™ devices) to a plurality of host devices 510, such as to integrate fitness or health information (as is commonly tracked by wearable devices) with video games or other software applications. Such an arrangement can also be used to bridge data between devices from different vendors or running different software or operating systems, for example to integrate health data from an APPLE WATCH™ device with a MICROSOFT XBOX™ gaming console, or fitness information from a FITBIT™ fitness tracker with a SONY PLAYSTATION™ gaming console, or other combinations of hardware, software, and vendors.

For example, according to a particular intended use such as for interaction with a home gaming console (for example, Microsoft XBOX™ or Sony PLAYSTATION™), a particular wireless protocol or hardware technology may be utilized, or a control device 500a-b may be configured with hardware means to utilize a number of communication protocols according to a particular use, while a user may be given an option to select a desired protocol or frequency for use. For example, a control device 500a-b configured for use with a desktop computer may be configured to utilize BLUETOOTH™ radio communication in the 2.4 GHz frequency range. A hardware switch or button 501b may optionally be provided whereby a user may select a different frequency as needed, for example a radio frequency in the 5 GHz range for use over a WiFi network instead of BLUETOOTH™, for example to increase range or speed or to avoid interference from other devices (for example, many microwave ovens used within a home or office may cause interference in the 2.4 GHz frequency band). The use of various wireless communication means may enable a user to hold a plurality of control devices 500a-b in any position or manner they choose, improving ergonomics and relieving discomfort or the risk of repetitive-stress injuries that may occur using traditional control devices that generally require a user to grasp them in a particular fashion (for example, a computer keyboard that generally requires a user's arms and hands to be in an awkward alignment).

By utilizing wireless connectivity according to the embodiment, increased movement or positioning of a plurality of control devices may be used as an additional interaction method for users, for example using gesture-based input methods or position-tracking via internal hardware sensors such as accelerometers or gyroscopes. In this manner, additional forms of input may be enabled at a user's preference, increasing the quality or quantity of interaction possible with a particular control device and optionally reducing the need for specific hardware buttons. For example, a gesture-enabled control device may be programmed with a particular motion gesture that simulates the pressing of a "volume up" button, eliminating the need for a hardware button to perform that function.

According to the embodiment, a plurality of hardware buttons may be provided on a control device 500a-b, and may vary in physical design or arrangement. For example, membrane or mechanical switch-based buttons may be utilized to provide a tactile sensation upon activation by a user (as is common in hardware keyboards intended for specific uses such as gaming or professional design), or capacitive touch-based buttons may be utilized to provide interaction in a more compact physical arrangement when tactile sensation may not be required (as is common in mobile applications, such as on-screen controls on a smartphone or tablet computing device).

Hardware buttons or other controls may be placed in various arrangements according to a particular use or desired functionality, for example a digital or analog "trigger"-style button 504 may be placed on the underside of a control device (shown in a side profile view) 500c, for example for use in gaming application where a trigger-actuated function may be desirable (such as in first-person, racing, or simulator games). Another exemplary arrangement may be a number of buttons 502a-n arranged in a particular fashion for use in navigation, such as to form a directional pad (D-pad) for use in a variety of games or applications, such as for navigating a media player interface or playing a video with a top-down view, such as a strategy or simulated board game. Other buttons may include large easily-reached buttons 501*a* for use in games or applications when a user may need to quickly select and actuate a button without looking. Such buttons may be provided with a variety of identifying features such as readable text labels, colors, or physical shapes for example including (but not limited to) a square 501*a*, circle 501*b*, triangle 503*a* or star-shaped 503*b* control buttons.

According to the embodiment, a particular exemplary arrangement may be a pair of controllers that in effect act as a single "split controller", wherein a user grasps each device in one hand and various functions are divided between the two devices to facilitate two-handed interaction without the need for using both hands on a unitary device. Controls may be arranged in a combined fashion, with directional buttons arranged about the top portion of each device, with a functional button positioned in the center of the directional buttons to provide an easily-reached button for interaction (for example, to "accept" or "click" on a menu item on-screen). Additionally, these combined control arrangements may then be coupled with a plurality of internal hardware sensors, such as accelerometers, gyroscopes, Hall effect sensors, or other hardware means of facilitating physical interaction through the capture and interpretation of sensor data, for example to enable interaction through the use of predefined or customizable gestures or position-tracking.

A variety of alternate or additional control device arrangements may be utilized in various combinations through a nested-communication protocol. For example, according to their planned use (such as for a particular game or application, or for use with a particular device or console) a user may select their preferred "primary" control device, and then pair a "secondary" control device with it. In this manner it may be appreciated that the specific number, style, or arrangement of buttons or other interactive features or physical design such as ergonomic shape or layout may vary widely, and a user may select the particular arrangements and combinations that appeal to them based on their particular needs or use. A variety of control device arrangements are described below, referring to FIG. 6, and it should be appreciate that any particular control device may be utilized as either a primary or secondary controller interchangeably, according to a user's preference. Additionally, through the use of various wireless communication technologies as described previously, additional hardware devices may be paired with a control device for nested communication. For example, fitness trackers (for example including, but not limited to, FITBIT™, MICROSOFT BAND™, or APPLE WATCH™ devices) may be paired via a wireless personal-area-network protocol such as BLUETOOTH™ or ANT™, for example to provide a user's biometric or health information along with interaction via a control device 500*a-b*.

Figure 6:
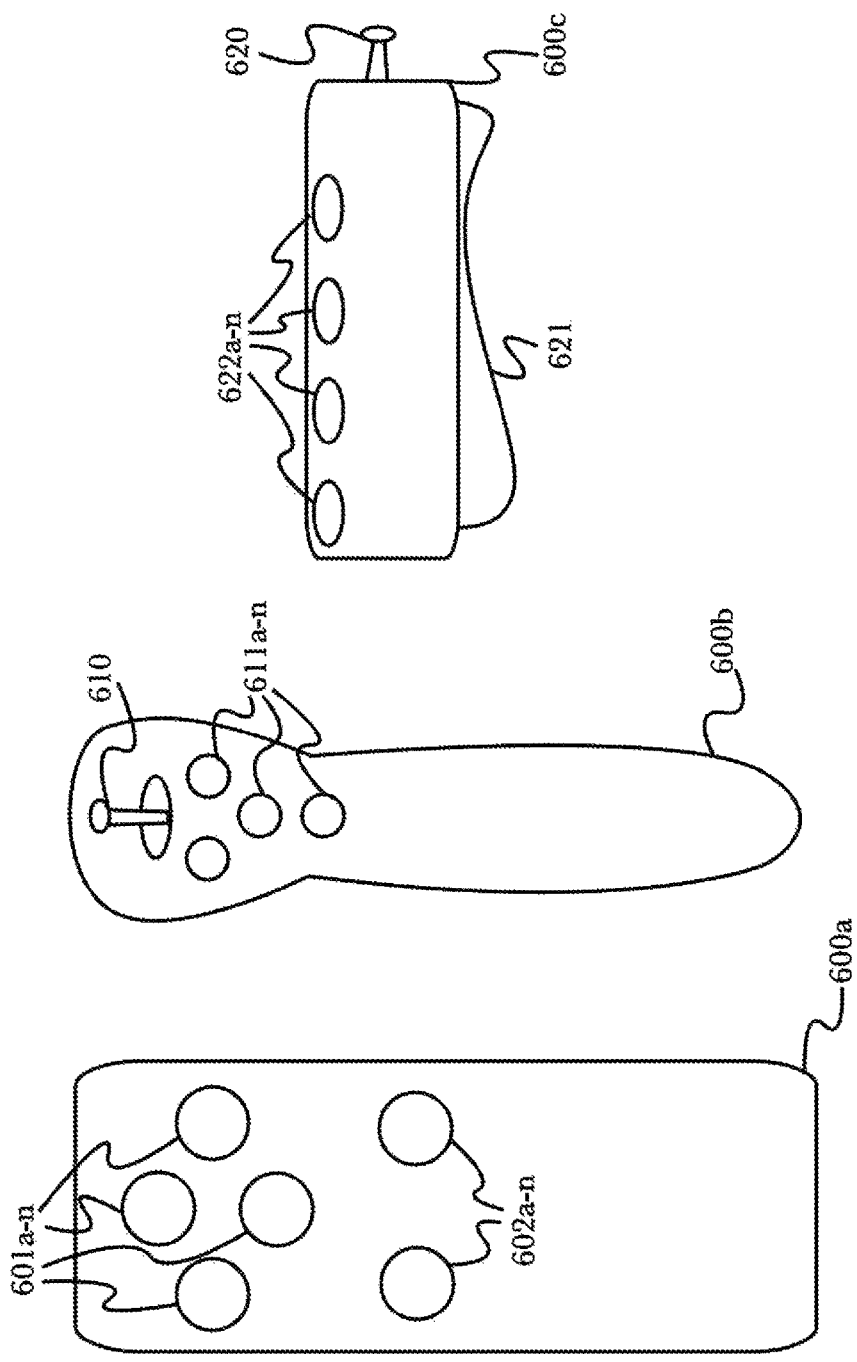
FIG. 6 is a diagram illustrating a variety of exemplary physical configurations of nested-communication wireless controllers, configured for various uses.

FIG. 6 is a diagram illustrating a variety of exemplary physical configurations of nested-communication wireless controllers 600*a-c*, configured for various uses. According to one exemplary arrangement, a controller 600*a* may be configured for optimum use as a media playback remote control, for example for use with a connected speaker or playback device, or with a home theater or media PC setup. According to such an arrangement, a number of buttons 601*a-n* may be arranged for use in navigating an on-screen interface of a media device, for example to select audio or video content from a library for playback. A number of additional buttons 602*a-n* may be arranged in a secondary location, to provide additional functions such as play/pause, stop, or menu functions such as to view additional information on selected media. According to a particular use, such a control device 600*a* may be used as a primary controller, optionally with or without a secondary controller paired for nested communication, such as a user's fitness tracking device for use in monitoring heartbeat or other biometric changes during media viewing, or a gaming controller for use in playing interactive content presented through a media server or playback device (for example, playing a game on a ROKU™ or similar home theater device connected to a television).

According to another exemplary arrangement, a controller 600*b* may be configured for a particular gaming use, for example formed with an appropriate physical shape and having control elements (buttons, switch, and other interactive hardware elements) arranged to best suit a simulation-type game. According to such a configuration, a control device 600*b* may have a digital or analog "joystick"-type control element 610 for use in controlling a player's character or vehicle in a 360-degree three-dimensional virtual environment, for example for use in third-person action or adventure-type games. A plurality of additional buttons 611*a-n* may be provided and arranged for easy one-handed use, such as to access a player's inventory, perform specific in-game actions (for example to jump, run, roll, or other movement controls), or to perform context-sensitive actions according to the nature of a particular game or application. For example, a simulator-oriented control device 600*b* may be paired with a media remote control device 600*a* as a secondary controller, enabling a user to navigate a media interface with the media remote 600*a* as their primary control device, select a game from a media content menu, and then use the secondary control device 600*b* to play the game. When finished playing, the user may then continue using their primary controller 600*a* to further navigate the media interface, without the need to locate a remote control or switch controllers for different uses, as both controllers may be paired and in communication, even while one may be temporarily unused.

According to a further exemplary arrangement, a control device may be configured for use specifically as a secondary controller, for example as a throttle controller 600*c* configured to be paired with a simulator controller 600*b* for use in a two-handed "hands on throttle and stick" (HOTAS) setup commonly used in flight-simulation games. According to such a configuration, a control device 600*c* may comprise a joystick or hat-switch control element 620 for navigation or for controlling a number of game or application functions with a user's thumb, generally positioned such that while holding control device 600*c* a user's thumb is naturally aligned with the control element 620 for ease of use. Control device 600*c* may further comprise an integrally-formed or removably affixed ergonomic portion 621, for example a removable or positionable rigid or soft panel, generally configured to conform to a user's hand or palm and align the user's hand for proper manipulation of various control elements. For example, in one exemplary arrangement, a control device 600*c* may be configured with a body made of a rigid plastic material and having a removable plastic panel 621 shaped to fit a user's palm for a proper grip and alignment during use. Such a configuration may also be designed to accept a variety of alternate rigid panels 621, enabling a user to swap grip panels to configure the physical shape of control device 600*c* to most comfortably fit their particular anatomy (for example, such a configuration has been used in the firearms industry to enable users to configure the grip of a handgun for proper posture and aiming). Control device 600*c* may further comprise a plurality of additional control elements 622*a-n* such as buttons or switches, for example arranged such that when properly aligned (as by using an ergonomic grip panel, as described previously) a user's fingers may naturally be aligned in a position for ideal activation of control elements 622a-n. In this manner, it may be appreciated that a control device 600a-c may be configured with ergonomic portions 621 in a variety of arrangements, and with various arrangements of control elements for optimal use when a user's hand is properly aligned and grasping control device 600a-c, such that any particular control device 600a-c may be tailored to fit a wide range of users' anatomies for optimal use, as well as to promote ergonomic comfort and physical health. For example, by encouraging users to find an optimum ergonomic fit, the risk of repetitive-stress injuries and other health concerns may be reduced.

Figure 7:
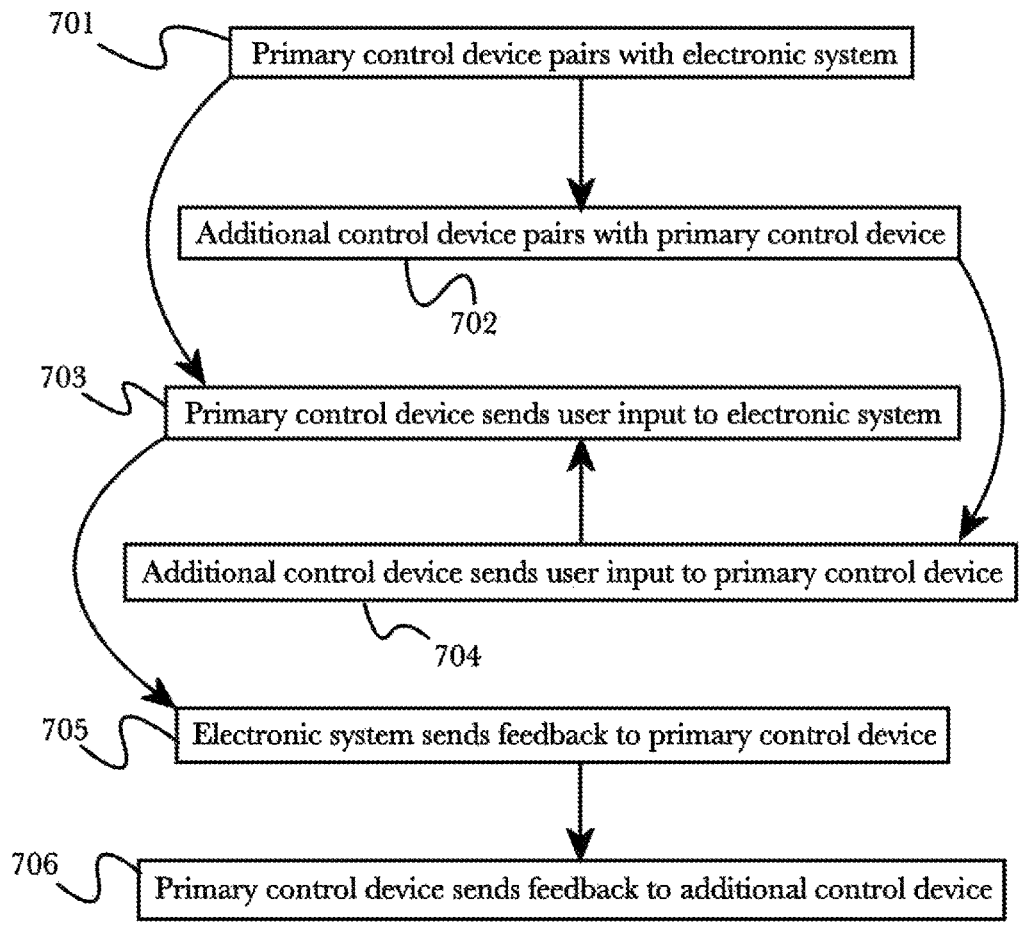
FIG. 7 is a flow diagram illustrating an exemplary method for nested communication between control devices and electronic systems, according to a preferred embodiment of the invention.

FIG. 7 is a flow diagram illustrating an exemplary method 700 for nested communication between control devices and electronic systems, according to a preferred embodiment of the invention. In an initial step 701, a control device may be paired with an electronic system (for example, such as a personal computer, gaming console, or home theater or media center) as a primary control device, for example either as an automatic process (such as when an electronic system or controller is first powered on) or manually (such as by direct user action to initiate pairing). In an optional next step 702, a plurality of additional control devices may be paired with the primary control device, for example for a user to use a control device in each hand, or for multiple users to each pair one or more control devices for their own use in a group arrangement (for example, for multiple users playing a video game together). In a next step 703, the primary control device may send a plurality of user interaction to a paired electronic system, for example when a user presses a button or makes a selection. In an optional next step 704, any of the plurality of additional control devices may send a plurality of user input to the primary device, and the primary control device may then send the user input to a paired electronic system. In a next step 705, a paired electronic system may send a plurality of feedback to the primary control device, such as instructions for haptic feedback (for example, to activate a vibration motor) or information for presentation on a visual display operated by a control device. In an optional final step 706, the primary control device may transmit a plurality of feedback to an additional control device, for example if feedback was sent from an electronic system intended for a connected additional control device. In this manner, it can be appreciated that all communication between control devices and electronic systems passes through and is facilitated by the primary control device.

The skilled person will be aware of a range of possible modifications of the various embodiments described above. Accordingly, the present invention is defined by the claims and their equivalents.

What is claimed is:

1. A system for using multiple electronic control devices to interact with electronic devices, comprising:
   an electronic control device comprising at least a plurality of programming instructions stored in a memory and operating on a processor of a network-connected computing device, wherein the processor, when operating the programming instructions, is configured to:
   communicate with a first plurality of electronic devices via a first wireless communication protocol;
   communicate with a second plurality of electronic devices via a second wireless communication protocol;
   operate a plurality of hardware control elements, the hardware control elements configured to receive a plurality of manual interaction from a user;
   transmit a plurality of interaction information to at least a portion of the first plurality of electronic devices, the interaction information being based at least in part on at least a portion of the plurality of manual interaction from the user;
   receive communication from at least a portion of the first plurality of electronic devices using the first wireless communication protocol; and
   convey at least a portion of the communication to at least a portion of the second plurality of electronic devices using the second wireless communication protocol.

2. The system of claim 1, wherein the plurality of electronic devices comprises at least a video gaming console.

3. The system of claim 2, wherein the plurality of electronic devices comprises at least a plurality of video gaming controllers.

4. The system of claim 2, wherein the plurality of electronic devices comprises at least a fitness tracking device.

5. The system of claim 4, wherein the fitness tracking device provides at least a plurality of fitness information to at least the video gaming console.

6. A method for nested communication between multiple electronic control devices and electronic systems, comprising the steps of:
   connecting, via a first electronic control device comprising at least a plurality of programming instructions stored in a memory and operating on a processor of a network-connected computing device, to a host electronic device using a first wireless communication protocol;
   connecting, using an additional electronic control device comprising at least another plurality of programming instructions stored in another memory and operating on another processor of another network-connected computing device, to the first electronic control device using a second wireless communication protocol;
   receiving a plurality of user interaction at the additional electronic control device;
   transmitting a plurality of interaction information to the first electronic control device, the interaction information being based at least in part on at least a portion of the user interaction; and
   conveying, at the first electronic control device, at least a portion of the interaction information to the host electronic device.

* * * * *